United States Patent
Omi et al.

(10) Patent No.: US 11,897,455 B2
(45) Date of Patent: Feb. 13, 2024

(54) AUTONOMOUS DRIVING SYSTEM, AUTONOMOUS DRIVING METHOD, AND STORAGE MEDIUM

(71) Applicant: TOYOTA JIDOSHA KABUSHIKI KAISHA, Toyota (JP)

(72) Inventors: Satoshi Omi, Ebina (JP); Takanori Imazu, Susono (JP); Yoshiki Fukada, Susono (JP); Takashi Hayashi, Mishima (JP); Yuta Kataoka, Tokyo (JP); Kohki Baba, Susono (JP); Ryuji Okamura, Susono (JP); Akihiro Kusumoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 17/808,217

(22) Filed: Jun. 22, 2022

(65) Prior Publication Data
US 2023/0055038 A1   Feb. 23, 2023

(30) Foreign Application Priority Data
Aug. 19, 2021  (JP) .................................. 2021-134431

(51) Int. Cl.
*B60W 30/06* (2006.01)
*G08G 1/14* (2006.01)
(Continued)

(52) U.S. Cl.
CPC ............ *B60W 30/06* (2013.01); *B60W 40/06* (2013.01); *G05D 1/0217* (2013.01); *G08G 1/144* (2013.01);
(Continued)

(58) Field of Classification Search
CPC .. B60W 30/06; B60W 40/06; B60W 2555/20; G05D 1/0217; G05D 2201/0213;
(Continued)

(56) References Cited

U.S. PATENT DOCUMENTS 10,481,609 B2 * 11/2019 Moosaei ................ G08G 1/146
11,287,280 B2 *  3/2022 Beaurepaire ....... G01C 21/3685
(Continued)

FOREIGN PATENT DOCUMENTS

JP    2019219212 A    12/2019
JP    2020149187 A     9/2020

*Primary Examiner* — Ryan W Sherwin
(74) *Attorney, Agent, or Firm* — Dickinson Wright, PLLC

(57) ABSTRACT

A vehicle is autonomously driven in an environment where a first road for vehicles running in a first direction and a second road for vehicles running in a second direction, different from the first direction, are provided alongside each other, and where a first parking space that is entered from the first road and exited to the first road is set and a second parking space that is entered from the second road and exited to the second road is set. When the vehicle is temporarily parked in the first parking space and a running direction of the vehicle heading for the next destination after being parked is the second direction, the vehicle is transferred from the first parking space to the second parking space by autonomous driving after a user of the vehicle gets out of the vehicle.

12 Claims, 10 Drawing Sheets

(51) Int. Cl.
 G05D 1/02 (2020.01)
 B60W 40/06 (2012.01)

(52) U.S. Cl.
 CPC ............ G08G 1/146 (2013.01); G08G 1/148 (2013.01); *B60W 2555/20* (2020.02); *G05D 2201/0213* (2013.01)

(58) Field of Classification Search
 CPC ........ G08G 1/144; G08G 1/146; G08G 1/148; G08G 1/096725
 See application file for complete search history.

(56) References Cited

U.S. PATENT DOCUMENTS

| | | | |
|---|---|---|---|
| 2018/0188045 A1* | 7/2018 | Wheeler | B60W 30/0956 |
| 2019/0064806 A1* | 2/2019 | Nix | B60W 50/00 |
| 2019/0064808 A1* | 2/2019 | Dyer | B60W 60/0025 |
| 2019/0111916 A1* | 4/2019 | Lee | B62D 15/0285 |
| 2019/0347821 A1* | 11/2019 | Stein | G08G 1/0112 |
| 2023/0278563 A1* | 9/2023 | Xiao | B60W 40/10 701/1 |

\* cited by examiner

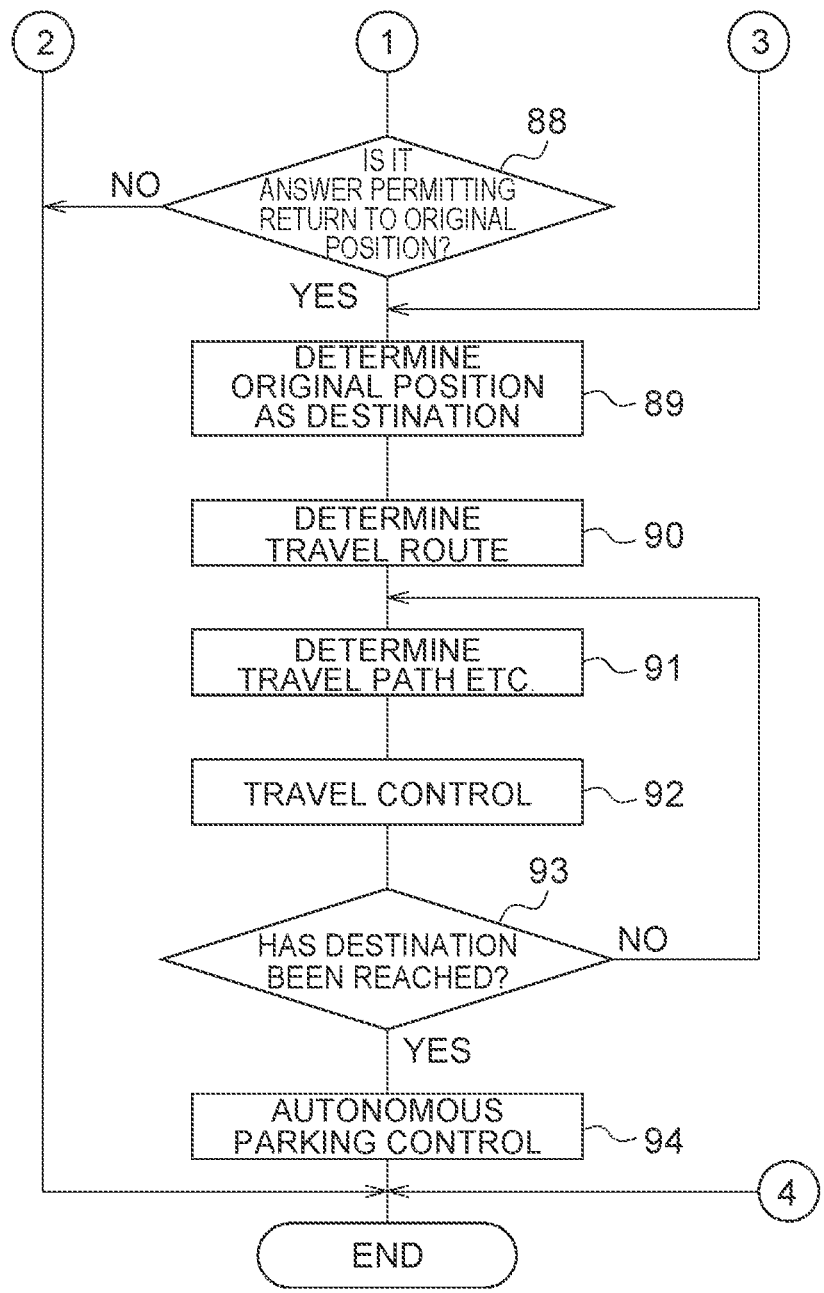

AUTONOMOUS DRIVING SYSTEM, AUTONOMOUS DRIVING METHOD, AND STORAGE MEDIUM

CROSS-REFERENCE TO RELATED APPLICATION

This application claims priority to Japanese Patent Application No. 2021-134431 filed on Aug. 19, 2021, incorporated herein by reference in its entirety.

BACKGROUND

1. Technical Field

The present disclosure relates to an autonomous driving system, an autonomous driving method, and a storage medium.

2. Description of Related Art

There is a publicly known autonomous parking system (e.g., see Japanese Unexamined Patent Application Publication No. 2019-219212 (JP 2019-219212 A)) in which, after a user of a vehicle gets out of the vehicle at a stop, the vehicle is made to wait at the stop when the duration of stay from a drop-off time to a desired pick-up time is shorter than a threshold value, for example, 10 minutes, and the vehicle is transferred to a standby parking lot along a driverless travel route by autonomous driving when the duration of stay from the drop-off time to the desired pick-up time is longer than the threshold value. In the latter case, if there is a parking lot with a lower parking fee even when it is located far away, the vehicle is transferred to that parking lot with a lower parking fee along a driverless travel route by autonomous driving.

SUMMARY

In the case where an autonomous driving vehicle is temporarily parked for a user of the vehicle to stop by a facility, such as a shop, and then runs toward the next destination after being temporarily parked, that next destination is sometimes located in a running direction that is different, for example, opposite from the running direction of the road that has been used so far. In such a situation, it is often the case that the vehicle cannot be moved to the road leading to the next destination in a short time after being temporarily parked, for example, that the vehicle can be moved to the road leading to the next destination only after running far along the road that has been used so far. The problem in such cases is that it takes a longer time to reach the next destination. However, the above-described autonomous parking system gives no consideration to such a problem.

The present disclosure provides a vehicle autonomous driving system that autonomously drives a vehicle in an environment where a first road for vehicles running in a first direction and a second road for vehicles running in a second direction, different from the first direction, are provided alongside each other, and where a first parking space that is entered from the first road and exited to the first road is set and a second parking space that is entered from the second road and exited to the second road is set.

This vehicle autonomous driving system includes:
an acquisition unit that acquires information about a next destination of a vehicle parked in the first parking space;
a recognition unit that recognizes, based on the acquired next destination, whether a running direction of the vehicle heading for the next destination is the second direction; and
a vehicle transfer control unit that, when it is recognized that the running direction of the vehicle heading for the next destination is the second direction, transfers the vehicle from the first parking space to the second parking space by autonomous driving after a user of the vehicle gets out of the vehicle.

Further, the present disclosure provides a vehicle autonomous driving method that autonomously drives a vehicle in an environment where a first road for vehicles running in a first direction and a second road for vehicles running in a second direction, different from the first direction, are provided alongside each other, and where a first parking space that is entered from the first road and exited to the first road is set and a second parking space that is entered from the second road and exited to the second road is set.

This vehicle autonomous driving method includes:
acquiring information about a next destination of a vehicle parked in the first parking space;
based on the acquired next destination, recognizing whether a running direction of the vehicle heading for the next destination is the second direction; and
when it is recognized that the running direction of the vehicle heading for the next destination is the second direction, transferring the vehicle from the first parking space to the second parking space by autonomous driving after a user of the vehicle gets out of the vehicle.

In addition, the present disclosure provides a storage medium storing a program that autonomously drives a vehicle in an environment where a first road for vehicles running in a first direction and a second road for vehicles running in a second direction, different from the first direction, are provided alongside each other, and where a first parking space that is entered from the first road and exited to the first road is set and a second parking space that is entered from the second road and exited to the second road is set.

This storage medium stores the program causing a computer to function to:
acquire information about a next destination of a vehicle parked in the first parking space;
based on the acquired next destination, recognize whether a running direction of the vehicle heading for the next destination is the second direction; and
when it is recognized that the running direction of the vehicle heading for the next destination is the second direction, transferring the vehicle from the first parking space to the second parking space by autonomous driving after a user of the vehicle gets out of the vehicle.

The present disclosure can shorten the time taken to move to the next destination.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a flowchart for performing the post-transfer process executed after transfer to a parking place.

DETAILED DESCRIPTION OF EMBODIMENTS

Figure 1A:
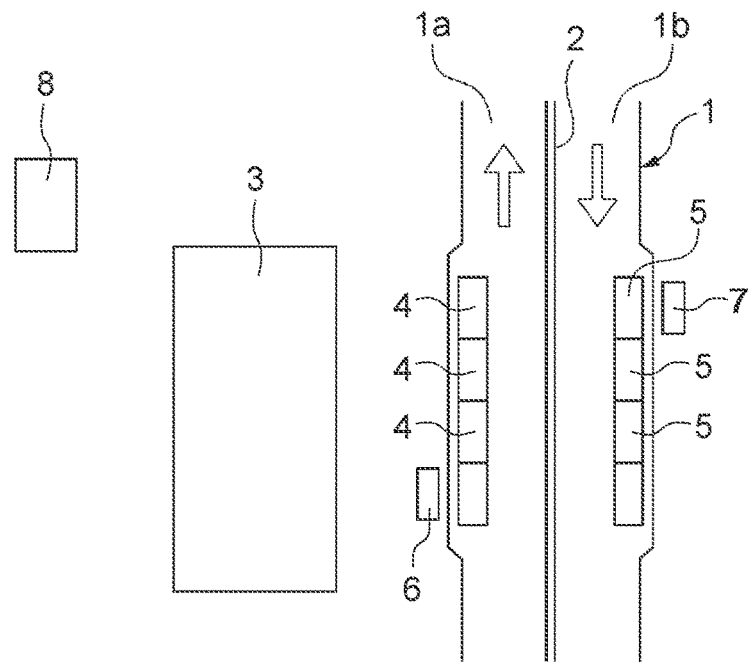
FIG. 1A is a view graphically representing roads and parking spaces.
Figure 1B:
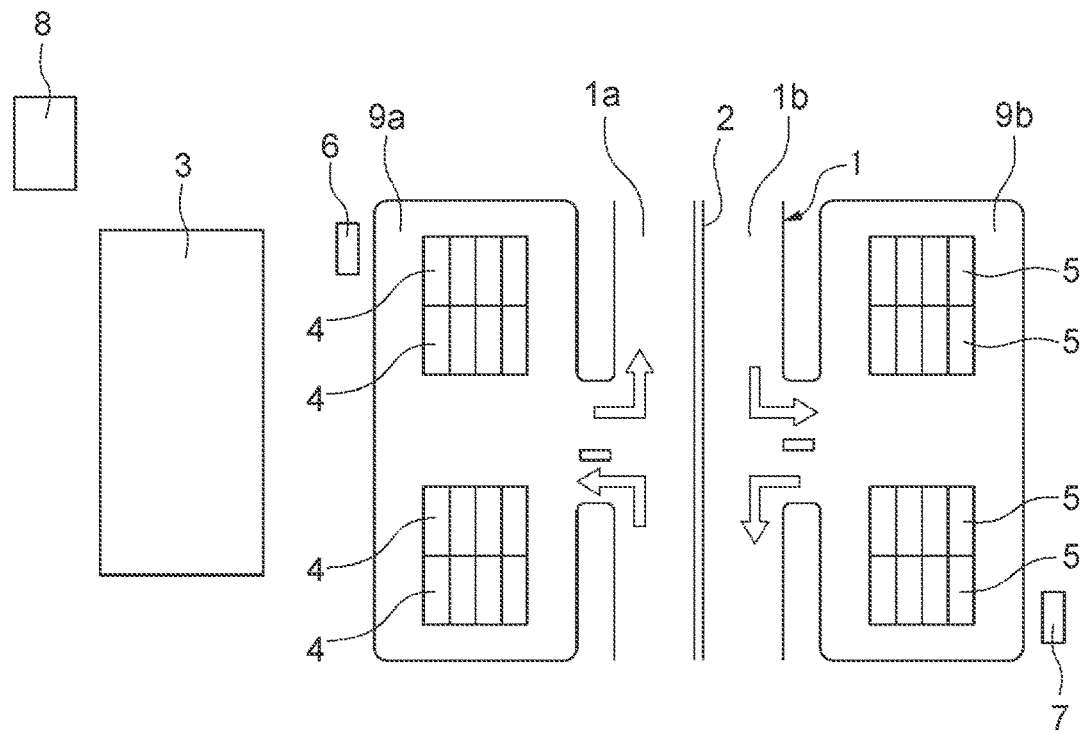
FIG. 1B is a view graphically representing roads and parking spaces.

First, an environment where the present disclosure is applied will be described with reference to FIG. 1A, FIG. 1B, and FIG. 2 that graphically represent roads and parking spaces. Referring to FIG. 1A and FIG. 1B, reference sign 1 denotes a road for vehicles that has a median strip 2, and the arrows depicted on the road 1 indicate running directions of vehicles. In the examples shown in FIG. 1A and FIG. 1B, the road 1 is composed of two roads that are formed adjacent to each other on both sides of the median strip 2, namely, a first road 1a for vehicles running in a first direction and a second road 1b for vehicles running in a second direction that is the opposite direction from the first direction. In FIG. 1A, reference sign 3 denotes a facility, such as a shop or a restaurant.

In the example shown in FIG. 1A, near the facility 3, a plurality of first parking spaces 4 that is entered from the first road 1a and exited to the first road 1a is set along the first road 1a, and a plurality of second parking spaces 5 that is entered from the second road 1b and exited to the second road 1b is set along the second road 1b. In the example shown in FIG. 1A, the first parking spaces 4 and the second parking spaces 5 are set on the opposite sides from each other across a border, i.e., the median strip 2, between the first road 1a and the second road 1b. A monitoring device 6 that monitors the state of use of the first parking spaces 4 by means of a camera etc. is installed near the first parking spaces 4, and a monitoring device 7 that monitors the state of use of the second parking spaces 5 by means of a camera etc. is installed near the second parking spaces 5. Information obtained by these monitoring devices 6, 7 is sent to a management server 8.

In the example shown in FIG. 1B, near the facility 3, a first parking lot 9a that is entered from the first road 1a and exited to the first road 1a and a second parking lot 9b that is entered from the second road 1b and exited to the second road 1b are set. A plurality of first parking spaces 4 is formed in the first parking lot 9a, and a monitoring device 6 that monitors the state of use of the first parking spaces 4 by means of a camera etc. is installed near the first parking lot 9a. A plurality of second parking spaces 5 is formed in the second parking lot 9b, and a monitoring device 7 that monitors the state of use of the second parking spaces 5 by means of a camera etc. is installed near the second parking lot 9b. Information obtained by these monitoring devices 6, 7 is sent to a management server 8.

Figure 2:
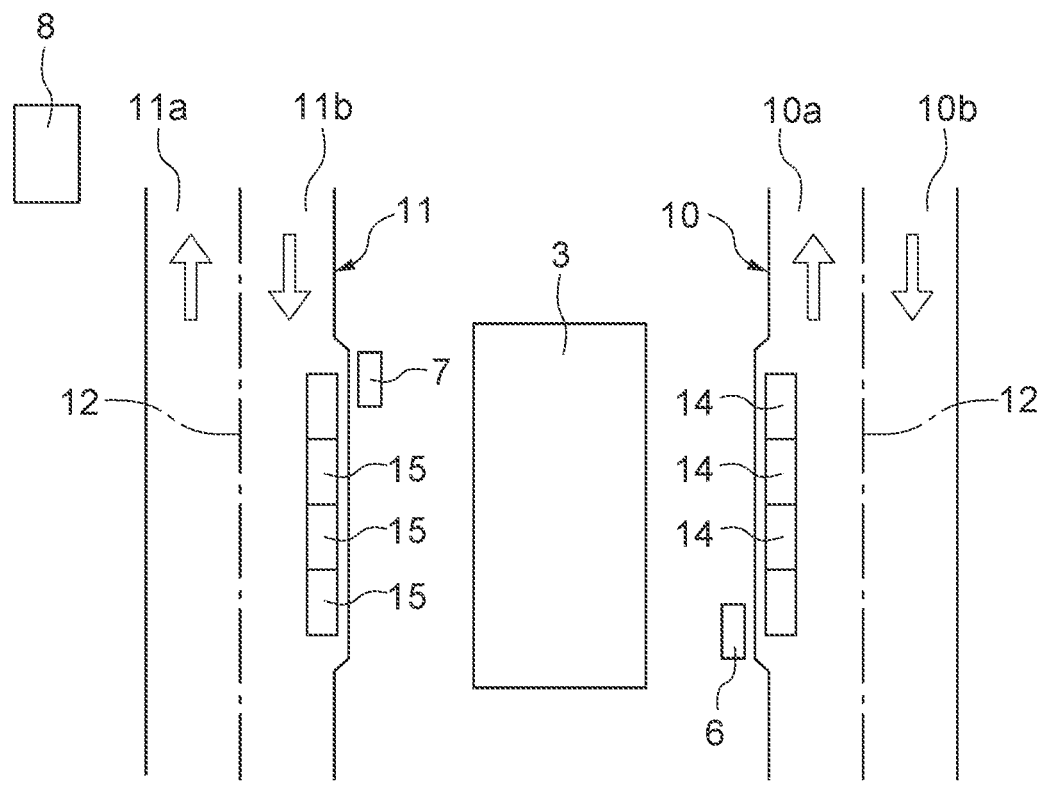
FIG. 2 is a view graphically representing roads and parking spaces.

Referring to FIG. 2, in the example shown in FIG. 2, roads 10, 11 for vehicles are formed on both sides of the facility 3. In FIG. 2, reference sign 12 denotes a centerline of each of the roads 10, 11, and the arrows depicted on the roads 10, 11 indicate running directions of vehicles. In the example shown in FIG. 2, the road 10 is composed of a first road 10a and a second road 10b that are formed adjacent to each other on both sides of the centerline 12, and the road 11 is composed of a first road 11a and a second road 11b that are formed adjacent to each other on both sides of the centerline 12. In this case, when looking at the first road 10a and the second road 11b, it can be said that the first road 10a for vehicles running in a first direction and the second road 11b for vehicles running in a second direction, different from the first direction, are present in the example shown in FIG. 2.

In this case, in the example shown in FIG. 2, a plurality of first parking spaces 14 that is entered from the first road 10a and exited to the first road 10a is set along the first road 10a, and a plurality of second parking spaces 15 that is entered from the second road 11b and exited to the second road 11b is set along the second road 11b. Also in the example shown in FIG. 2, as in the examples shown in FIG. 1A and FIG. 1B, monitoring devices 6, 7 that monitor the states of use of the first parking spaces 14 and the second parking spaces 15, respectively, are set near the first parking spaces 14 and the second parking spaces 15, and information obtained by these monitoring devices 6, 7 is sent to a management server 8. In the example shown in FIG. 2, in some cases, a first parking lot and a second parking lot as shown in FIG. 1B are set instead of the first parking spaces 14 and the second parking spaces 15.

Figure 3:
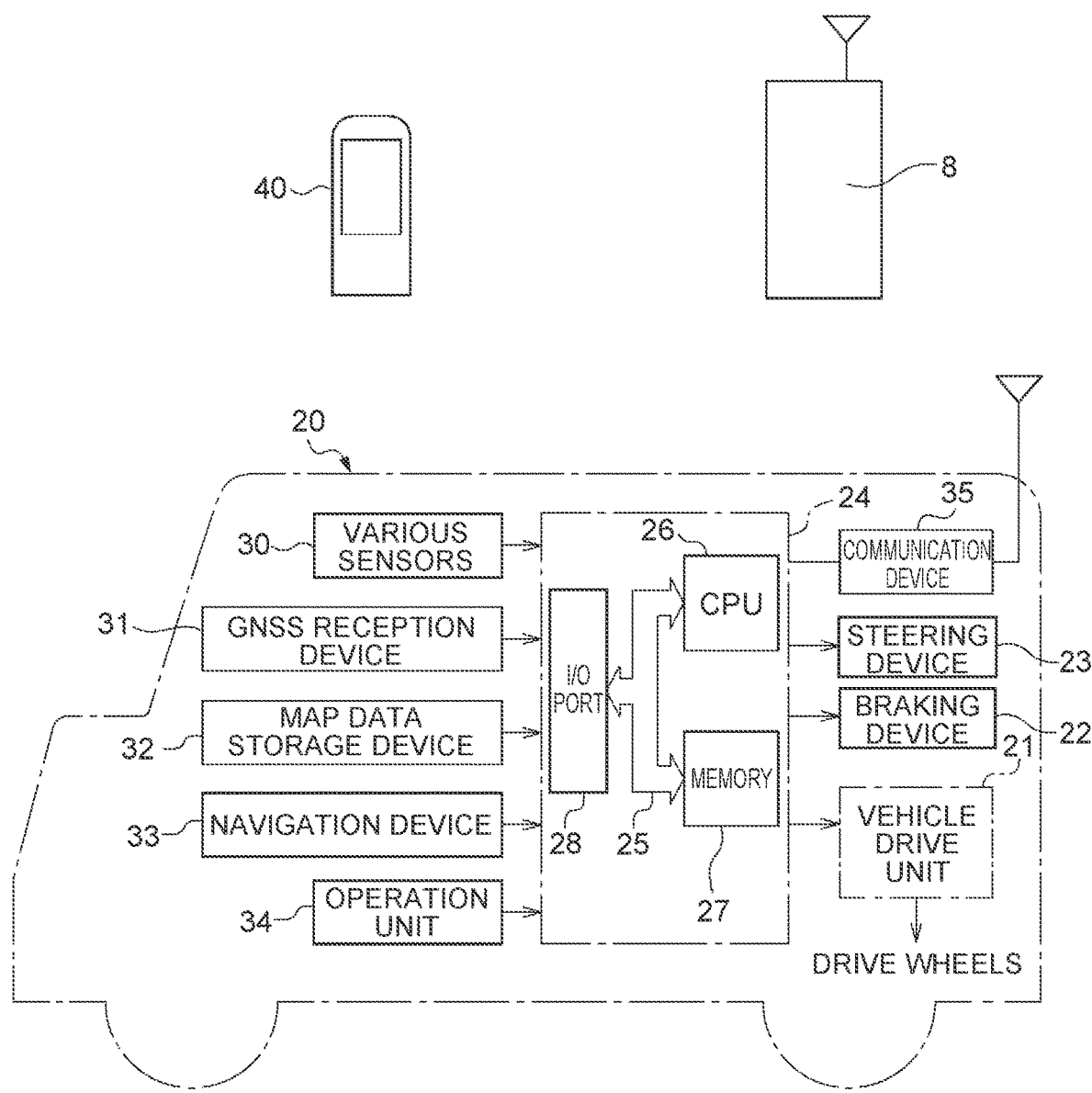
FIG. 3 is a view graphically showing a vehicle.

Next, a vehicle 20 having an autonomous driving function and an autonomous parking function will be described with reference to FIG. 3 that graphically shows the vehicle 20. Referring to FIG. 3, reference sign 21 denotes a vehicle drive unit that applies a drive force to drive wheels of the vehicle 20; reference sign 22 denotes a braking device that brakes the vehicle 20; reference sign 23 denotes a steering device that steers the vehicle 20; and reference sign 24 denotes an electronic control unit installed inside the vehicle 20. As shown in FIG. 3, the electronic control unit 24 is formed by a digital computer and includes a CPU (microprocessor) 26, a memory 27 including a ROM and a RAM, and an input-output port 28 that are connected to one another by a bidirectional bus 25.

As shown in FIG. 3, various sensors 30 required for the vehicle 20 to perform autonomous driving and autonomous parking, i.e., sensors that detect the state of the vehicle 20 and sensors that detect the surroundings of the vehicle 20 are installed in the vehicle 20. In this case, an acceleration sensor, a speed sensor, and an azimuth angle sensor are used as sensors that detect the state of the vehicle 20, and a camera that images a front side, lateral sides, and a rear side of the vehicle 20, a lidar, a radar, and the like are used as sensors that detect the surroundings of the vehicle 20. Further, the vehicle 20 is provided with a global navigation satellite system (GNSS) reception device 31, a map data storage device 32, a navigation device 33, and an operation unit for performing various operations. The GNSS reception device 31 can detect the current position of the vehicle 20 (e.g., the latitude and the longitude of the vehicle 20) based on information obtained from a plurality of satellites. Thus, the current position of the vehicle 20 can be acquired by the GNSS reception device 31. For example, a GPS reception device is used as the GNSS reception device 31.

The map data storage device 32 stores map data and the like required for the vehicle 20 to perform autonomous driving. An operation unit 34 is provided with an operation panel required for autonomous driving etc., and when a destination is input in the operation panel, a travel route of the vehicle 20 is searched for using the navigation device 33. These various sensors 30, GNSS reception device 31, map data storage device 32, navigation device 33, and operation unit 34 are connected to the electronic control unit 24. In FIG. 3, the management server 8 shown in FIG. 1A, FIG. 1B, and FIG. 2 is also depicted, and a communication device 35 for communicating with the management server 8 is installed in the vehicle 20. Further, in FIG. 3, a mobile terminal 40 that the user of the vehicle 20 owns and that can communicate with the communication device 35 of the vehicle 20 through a communication network is shown. A user who uses the autonomous parking system according to the present disclosure is referred to as the user of the vehicle 20.

Referring to FIG. 3, in the embodiment according to the present disclosure, the vehicle drive unit 21 is formed by an electric motor driven by a secondary battery or an electric motor driven by a fuel cell, and driving of the drive wheels is controlled by this electric motor in accordance with an output signal of the electronic control unit 24. Braking of the vehicle 20 is controlled by the braking device 22 in accordance with an output signal of the electronic control unit 24, and steering of the vehicle 20 is controlled by the steering device 23 in accordance with an output signal of the electronic control unit 24.

Figure 4:
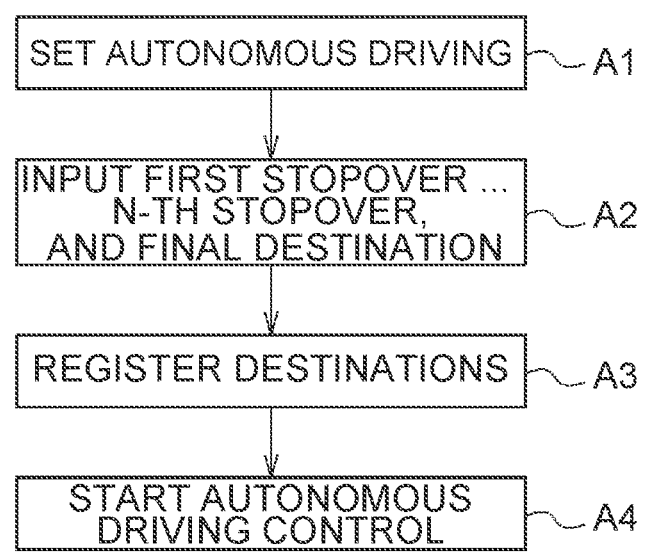
FIG. 4 is a view showing one example of operation when starting autonomous driving.

Next, the outline of autonomous driving by the vehicle 20 will be described with reference to FIG. 3 to FIG. 5. FIG. 4 shows one example of operation when starting autonomous driving by the vehicle 20, and this operation is performed on the operation panel of the operation unit 34. In the example shown in FIG. 4, first, as shown in A1 of FIG. 4, autonomous driving setting operation is performed to set the form of driving of the vehicle 20 to autonomous driving. This autonomous driving setting operation is executed by, for example, touching an item "autonomous driving setting" displayed on the operation panel of the operation unit 34. When the item "autonomous driving setting" displayed on the operation panel of the operation unit 34 is touched, an input screen for destinations appears on the operation panel of the operation unit 34. As shown in A2 of FIG. 4, in this input screen, a first stopover that is the first destination, a second stopover that is the next destination . . . an N-th stopover that is the N-th destination, and a final destination are input.

When the destinations have been input, these destinations are registered as shown in A3 of FIG. 4. This registration of destinations is executed by, for example, touching an item "register" displayed on the operation panel of the operation unit 34. When the destinations are registered, the input destinations are stored inside the memory 27 of the electronic control unit 24 installed in the vehicle 20. When the destinations are registered, autonomous driving control of the vehicle 20 starts as shown in A4 of FIG. 4. FIG. 5 shows a routine for performing the autonomous driving control of the vehicle 20, and this routine is repeatedly executed in the CPU 26 of the electronic control unit 24 installed in the vehicle 20.

Figure 5:
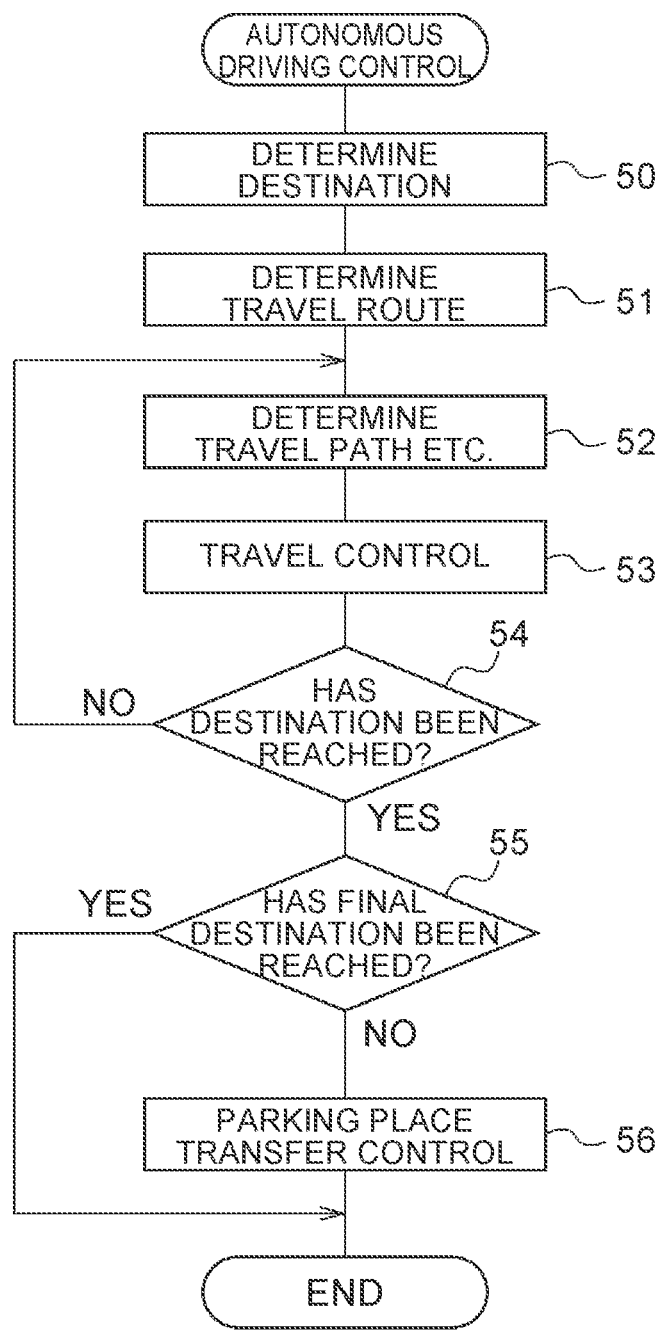
FIG. 5 is a flowchart for performing autonomous driving control.

Referring to FIG. 5, first, in step 50, the next destination is determined from among the destinations stored in the memory 27 of the electronic control unit 24. When the next destination is determined, the process moves to step 51, in which a travel route of the vehicle 20 from the current position to the next destination is determined by the navigation device 33 based on the determined next destination and the current position of the vehicle 20 acquired by the GNSS reception device 31. Next, in step 52, based on detection results of sensors including the camera that images the front side etc. of the vehicle 20, the lidar, the radar, and the like, a travel path and a travel speed of the vehicle 20 such that the vehicle 20 does not hit other vehicles or pedestrians are determined.

Next, in step 53, travel control of the vehicle 20 is performed in accordance with the determined travel path and travel speed. Then, in step 54, it is determined whether the vehicle 20 has reached the next destination determined in step 50. When it is determined that the vehicle 20 has not reached the next destination, the process returns to step 52 and autonomous driving of the vehicle 20 is continued. In this way, the vehicle 20 is autonomously driven to the determined next destination.

In the case where the vehicle 20 is parked in a parking space near the facility 3, for example, the first parking space 4 formed along the first road 1a in FIG. 1A, or the first parking space 4 formed inside the first parking lot 9a that can be entered and exited only from and to the first road 1a in FIG. 1B, or the first parking space 14 formed along the first road 10a in FIG. 2, for the user of the vehicle 20 to stop by the facility 3, the next destination which the user of the vehicle 20 heads for after the vehicle 20 is temporarily parked is sometimes located in a running direction different from the running direction of the first road 1a or 10a that has been used so far. Specifically, in the examples shown in FIG. 1A and FIG. 1B, the next destination may be located in the opposite direction from the running direction of the first road 1a that has been used so far, i.e., in the running direction of the second road 1b, and in the example shown in FIG. 2, the next destination may be located in a running direction different from the running direction of the first road 10a that has been used so far, for example, in the running direction of the second road 11b.

In this case, however, in the examples shown in FIG. 1A and FIG. 1B, the vehicle 20 can be moved to the second road 1b leading to the next destination only after running far along the first road 1a that has been used so far, and in the example shown in FIG. 2, the vehicle 20 can be moved to the second road 11b leading to the next destination only after running far along the first road 10a that has been used so far. Thus, the problem in the examples as shown in FIG. 1A, FIG. 1B, and FIG. 2 is that it takes a longer time to reach the next destination.

As a solution, in the embodiment according to the present disclosure, when the next destination for which the user of the vehicle 20 heads after the vehicle 20 is temporarily parked is located in a running direction different from the running direction of the first road 1a or 10a that has been used so far, after the vehicle 20 reaches the first parking space 4 or 14 and the user of the vehicle 20 gets out of the vehicle 20, the vehicle 20 is transferred by autonomous driving to the second parking space 5 formed along the second road 1b in FIG. 1A, to the second parking space 5 formed inside the second parking lot 9b that can be entered and exited only from and to the second road 1b in FIG. 1B, and to the second parking space 15 formed along the second road 10b in FIG. 2 such that the vehicle 20 can exit to the second road 1b or 10b oriented in the running direction different from the running direction of the first road 1a or 10a that has been used so far.

To thus transfer the vehicle 20 from one parking place to another, in the embodiment according to the present disclosure, as shown in FIG. 5, when it is determined in step 54 that the vehicle 20 has reached the determined next destination, the process moves to step 55, in which it is determined whether the vehicle 20 has reached the final destination. When the reached destination is not the final destination, the process moves to step 56, in which control of transfer of the vehicle 20 to a parking place is performed. This control of transfer of the vehicle 20 to a parking place is executed by the parking place transfer control routine shown in FIG. 7 and FIG. 8.

Figure 6:
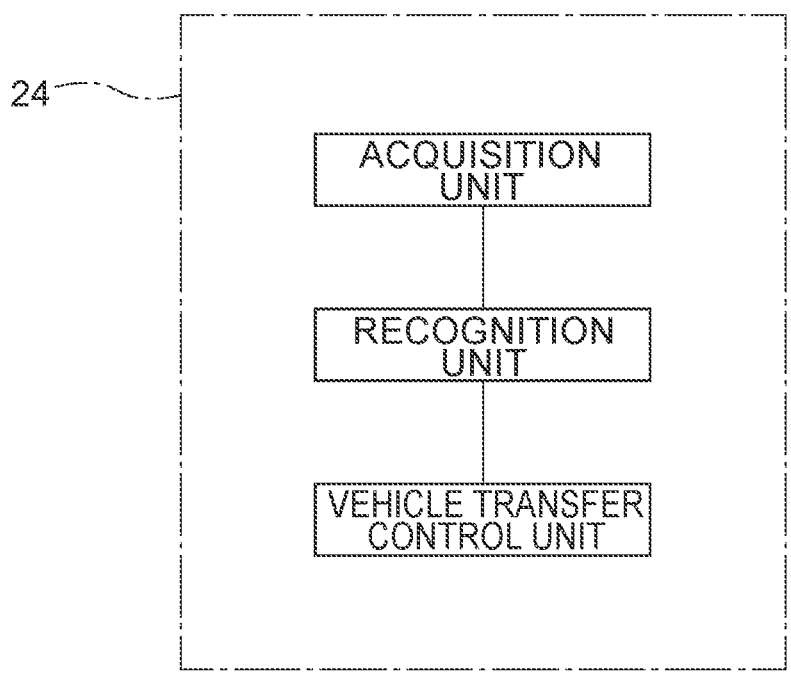
FIG. 6 is a functional configuration diagram of an embodiment according to the present disclosure.

In the embodiment according to the present disclosure, the vehicle autonomous driving system autonomously drives the vehicle 20 in an environment where the first road 1a or 10a for vehicles running in the first direction and the second road 1b or 11b for vehicles running in the second direction, different from the first direction, are provided alongside each other, and where the first parking space 4 or 14 that is entered from the first road 1a or 10a and exited to the first road 1a or 10a is set and the second parking space 5 or 15 that is entered from the second road 1b or 11b and exited to the second road 1b or 11b is set. As shown in the functional configuration diagram of FIG. 6, this autonomous driving system includes: an acquisition unit that acquires information about the next destination of the vehicle 20 parked in the first parking space 4 or 14; a recognition unit that recognizes, based on the acquired next destination, whether the running direction of the vehicle 20 heading for the next destination is the second direction; and a vehicle transfer control unit that, when it is recognized that the running direction of the vehicle 20 heading for the next destination is the second direction, transfers the vehicle 20 from the first parking space 4 or 14 to the second parking space 5 or 15 by autonomous driving after the user of the vehicle 20 gets out of the vehicle 20. In this case, in the embodiment according to the present disclosure, the electronic control unit 24 of the vehicle 20 constitutes the acquisition unit, the recognition unit, and the vehicle transfer control unit.

Further, the embodiment according to the present disclosure provides a vehicle autonomous driving method that autonomously drives the vehicle 20 in an environment where the first road 1a or 10a for vehicles running in the first direction and the second road 1b or 11b for vehicles running in the second direction, different from the first direction, are provided alongside each other, and where the first parking space 4 or 14 that is entered from the first road 1a or 10a and exited to the first road 1a or 10a is set and the second parking space 5 or 15 that is entered from the second road 1b or 11b and exited to the second road 1b or 11b is set. This vehicle autonomous driving method includes: acquiring information about the next destination of the vehicle 20 parked in the first parking space 4 or 14; based on the acquired next destination, recognizing whether the running direction of the vehicle 20 heading for the next destination is the second direction; and when it is recognized that the running direction of the vehicle 20 heading for the next destination is the second direction, transferring the vehicle 20 from the first parking space 4 or 14 to the second parking space 5 or 15 by autonomous driving after the user of the vehicle 20 gets out of the vehicle 20.

In addition, the embodiment according to the present disclosure provides a storage medium storing a program that autonomously drives the vehicle 20 in an environment where the first road 1a or 10a for vehicles running in the first direction and the second road 1b or 11b for vehicles running in the second direction, different from the first direction, are provided alongside each other, and where the first parking space 4 or 14 that is entered from the first road 1a or 10a and exited to the first road 1a or 10a is set and the second parking space 5 or 15 that is entered from the second road 1b or 11b and exited to the second road 1b or 11b is set. This program causes a computer to function to: acquire information about the next destination of the vehicle 20 parked in the first parking space 4 or 14; based on the acquired next destination, recognize whether the running direction of the vehicle 20 heading for the next destination is the second direction; and when it is recognized that the running direction of the vehicle 20 heading for the next destination is the second direction, transfer the vehicle 20 from the first parking space 4 or 14 to the second parking space 5 or 15 by autonomous driving after the user of the vehicle 20 gets out of the vehicle 20. The program is stored in a storage medium.

Figure 7:
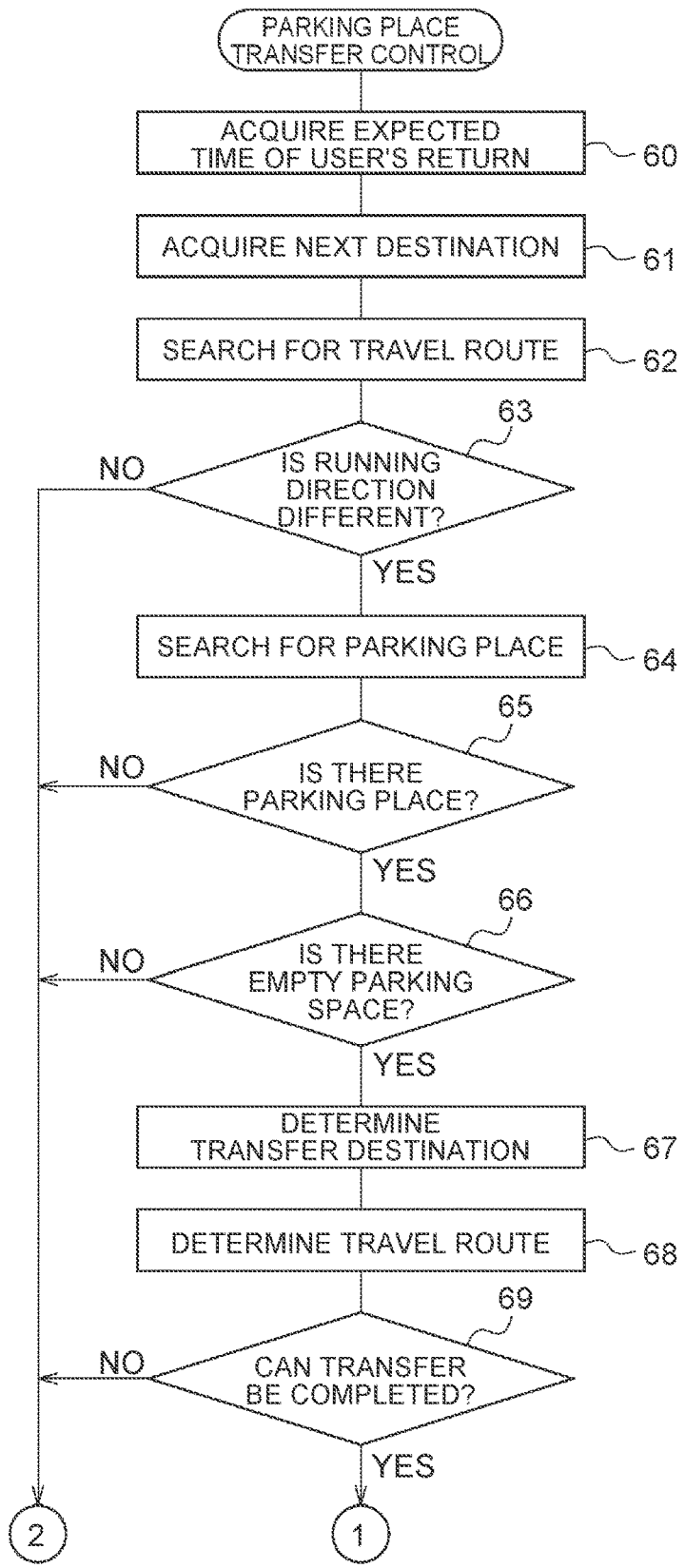
FIG. 7 is a flowchart for performing parking place transfer control.
Figure 8:
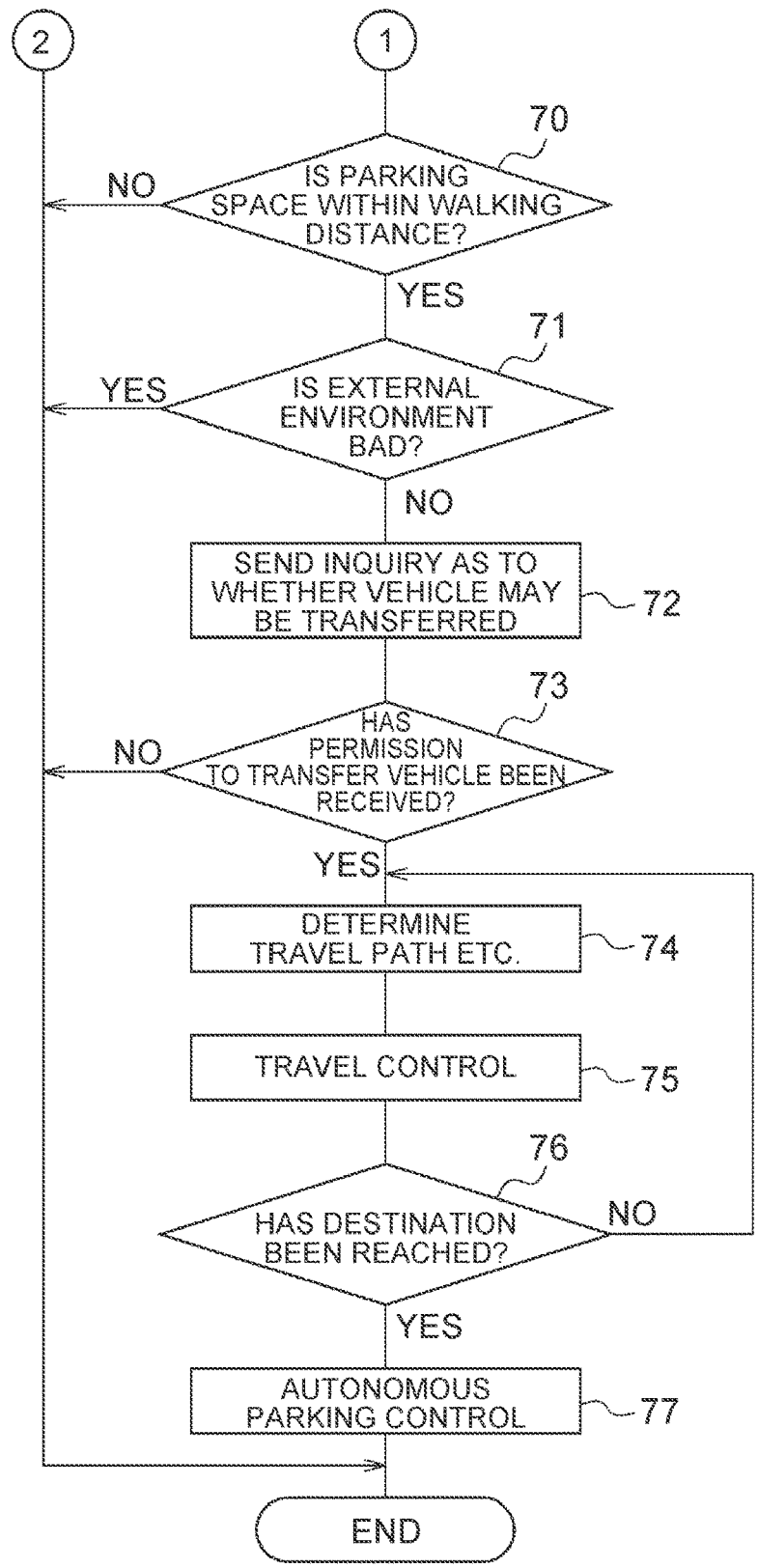
FIG. 8 is a flowchart for performing the parking place transfer control.

FIG. 7 and FIG. 8 show a parking place transfer control routine for executing control of transfer of the vehicle 20 to a parking place in step 56 of FIG. 5. This routine is executed by the electronic control unit 24 of the vehicle 20.

Referring to FIG. 7 and FIG. 8, first, in step 60, the time when the user returns to the first parking space 4 or 14 at which the vehicle 20 is currently parked is acquired. For example, this time of return is sent from the mobile terminal 40 that the user of the vehicle 20 owns to the vehicle 20 through the communication network. Next, in step 61, the next destination is acquired from among the registered destinations. Then, in step 62, based on the acquired next destination and the current position of the vehicle 20 acquired by the GNSS reception device 31, a travel route of the vehicle 20 from the current position to the next destination is searched for by the navigation device 33.

Next, in step 63, based on the travel route searched for, it is determined whether the acquired next destination is located in a running direction different from the running direction of the first road 1a or 10a that has been used so far. When it is determined that the acquired next destination is located in the same running direction as the running direction of the first road 1a or 10a that has been used so far, the process cycle is ended. On the other hand, when it is determined that the acquired next destination is located in a running direction different from the running direction of the first road 1a or 10a that has been used so far, the process moves to step 64, in which, based on the map information stored in the map data storage device 32, for example, a search is made for a parking place, i.e., the second parking space 5 or 15, that the vehicle 20 can exit to the second road 1b or 10b that is oriented in a running direction different from the running direction of the first road 1a or 10a that has been used so far.

Next, in step 65, it is determined based on the search result whether there is a parking place in the surrounding area that the vehicle 20 can exit to the second road 1b or 10b oriented in the running direction different from the running direction of the first road 1a or 10a that has been used so far. When it is determined that there is no parking place in the surrounding area that the vehicle 20 can exit to the second road 1b or 10b oriented in the running direction different from the running direction of the first road 1a or 10a that has been used so far, the process cycle is ended. On the other hand, when it is determined that there is a parking place in the surrounding area that the vehicle 20 can exit to the second road 1b or 10b oriented in the running direction different from the running direction of the first road 1a or 10a that has been used so far, i.e., when it is determined that the second parking space 5 or 15 is located in the surrounding area, the process moves to step 66, in which it is determined whether there is an empty parking space among the second parking spaces 5 or 15 by accessing the management server 8.

When it is determined that there is no empty parking space among the second parking spaces 5 or 15, the process cycle is ended. On the other hand, when it is determined that there is an empty parking space among the second parking spaces 5 or 15, the process moves to step 67, in which the empty parking space is determined as a transfer destination. Next, in step 68, based on the determined transfer destination and the current position of the vehicle 20 acquired by the GNSS reception device 31, a travel route of the vehicle 20 from the current position to the next destination is determined by the navigation device 33. Next, in step 69, based on the determined travel route of the vehicle 20 and the user's return time, it is determined whether transfer of the vehicle 20 to the transfer destination can be completed by the user's return time. When it is determined that transfer of the vehicle 20 to the transfer destination cannot be completed by the user's return time, the process cycle is ended. On the other hand, when it is determined that transfer of the vehicle 20 to the transfer destination can be completed by the user's return time, the process moves to step 70.

In step 70, based on the map information stored in the map data storage device 32, for example, it is determined whether the second parking space 5 or 15 is located within a walking distance, i.e., whether the distance from the first parking space 4 or 14 to the second parking space 5 or 15 is equal to or shorter than a predetermined distance, or whether the time taken to walk from the first parking space 4 or 14 to the second parking space 5 or 15 is equal to or shorter than a predetermined time. When it is determined that the second parking space 5 or 15 is not located within a walking distance, for example, when it is determined that the distance from the first parking space 4 or 14 to the second parking space 5 or 15 is short but that, due to the absence of a pedestrian crossing or an overpass, it takes time to move from the first parking space 4 or 14 to the second parking space 5 or 15 by foot, the process cycle is ended. On the other hand, when it is determined that the second parking space 5 or 15 is located within a walking distance, the process moves to step 71.

In step 71, it is determined whether the external environment is bad, for example, whether the weather is bad, such as rainy, snowy, or windy, or whether the road condition is bad, such as covered with snow or unpaved. When it is determined that the external environment is bad, i.e., when it is determined that the weather is bad or when it is determined that the road condition is bad, the process cycle is ended. On the other hand, when it is determined that the external environment is not bad, the process moves to step 72, in which an inquiry as to whether the vehicle 20 may be transferred from the first parking space 4 or 14 to the second parking space 5 or 15 is sent to the mobile terminal 40 of the user of the vehicle 20. Next, in step 73, it is determined whether a notification permitting the transfer of the vehicle 20 from the first parking space 4 or 14 to the second parking space 5 or 15 has been received from the user of the vehicle 20. When it is determined that a notification permitting the transfer of the vehicle has not been received from the user of the vehicle 20, the process cycle is ended. On the other hand, when it is determined that a notification permitting the transfer of the vehicle has been received, the process moves to step 74, in which the vehicle 20 is transferred from the first parking space 4 or 14 to the second parking space 5 or 15 by autonomous driving.

Specifically, in step 74, based on detection results of sensors including the camera that images the front side etc. of the vehicle 20, the lidar, the radar, and the like, a travel path and a travel speed of the vehicle 20 in the travel route determined in step 68 are determined such that the vehicle 20 does not hit other vehicles or pedestrians. Next, in step 75, travel of the vehicle 20 is controlled in accordance with the determined travel path and travel speed. Then, in step 76, it is determined whether the vehicle 20 has reached the transfer destination, i.e., the second parking space 5 or 15. When it is determined that the vehicle 20 has not reached the transfer destination, the process returns to step 74 and autonomous driving of the vehicle 20 is continued. In this way, the vehicle 20 is autonomously driven to the transfer destination. When it is determined in step 76 that the vehicle 20 has reached the transfer destination, i.e., the second parking space 5 or 15, the process moves to step 77, in which autonomous parking control is performed.

In this autonomous parking control, for example, the camera that images the front side, the lateral sides, and the rear side of the vehicle 20 generates a two-dimensional image of the vehicle 20 and the surroundings of the vehicle 20 as seen from above. Based on this two-dimensional image, a travel path required to transfer the vehicle 20 to a parking position inside the empty parking space without hitting other vehicles and structures in the surrounding area is generated, and the vehicle 20 is transferred to the parking position inside the empty parking space along this travel path by autonomous driving. When the vehicle 20 stops at the parking position inside the empty parking space and the autonomous parking process of the vehicle 20 ends, a notification saying that the vehicle 20 has been transferred from the first parking space 4 or 14 to the second parking space 5 or 15 is sent to the mobile terminal 40 of the user of the vehicle 20.

Thus, in the embodiment according to the present disclosure, when the vehicle 20 has been transferred from the first parking space 4 or 14 to the second parking space 5 or 15 by autonomous driving, a notification saying that the vehicle 20 has been transferred is sent to the mobile terminal 40 of the user of the vehicle 20. Further, in the embodiment according to the present disclosure, after the vehicle 20 is parked in the first parking space 4 or 14, information about the time taken for the user of the vehicle 20 to return to the vehicle 20 is acquired by the acquisition unit (FIG. 6), and the vehicle 20 is transferred from the first parking space 4 or 14 to the second parking space 5 or 15 when the vehicle 20 can be transferred from the first parking space 4 or 14 to the second parking space 5 or 15 before the user of the vehicle 20 returns to the vehicle 20.

In the embodiment according to the present disclosure, the vehicle 20 is transferred from the first parking space 4 or 14 to the second parking space 5 or 15 by autonomous driving when the distance from the first parking space 4 or 14 to the second parking space 5 or 15 is equal to or shorter than the predetermined distance or when the time taken to walk from the first parking space 4 or 14 to the second parking space 5 or 15 is equal to or shorter than the predetermined time. Further, in the embodiment according to the present disclosure, information about the external environment is acquired by the acquisition unit (FIG. 6), and the vehicle 20 is not transferred from the first parking space 4 or 14 to the second parking space 5 or 15 when the weather is bad or the road condition is bad.

Next, a post-transfer process that is performed after transfer to a parking place will be described. As described above, the vehicle 20 is transferred from the first parking space 4 or 14 to the second parking space 5 or 15 with permission of the user of the vehicle 20. It is possible that after the vehicle 20 is transferred, the user of the vehicle 20 may not be able to find the vehicle 20 that has been transferred. As a solution, in the embodiment according to the present disclosure, when the user of the vehicle 20 cannot find the vehicle 20 having been transferred, information showing the position of the vehicle 20 is provided to the user of the vehicle 20 upon request from the user of the vehicle 20, and when the user of the vehicle 20 cannot still find the vehicle 20 having been transferred, the vehicle 20 is transferred to the original parking position, i.e., the first parking space 4 or 14, by autonomous driving with permission of the user of the vehicle 20.

Moreover, in the embodiment according to the present disclosure, also when the vehicle 20 has not been driven for a first predetermined time X1 or longer after the transfer of the vehicle, the vehicle 20 is transferred to the original parking position, i.e., the first parking space 4 or 14, by autonomous driving with permission of the user of the vehicle 20. When the vehicle 20 has not been driven for a second predetermined time X2, longer than the first predetermined time X1, or longer after the transfer of the vehicle, the user of the vehicle 20 is notified that the vehicle 20 is going to be returned to the original parking position, and the vehicle 20 is transferred to the original parking position, i.e., the first parking space 4 or 14, by autonomous driving.

Figure 9:
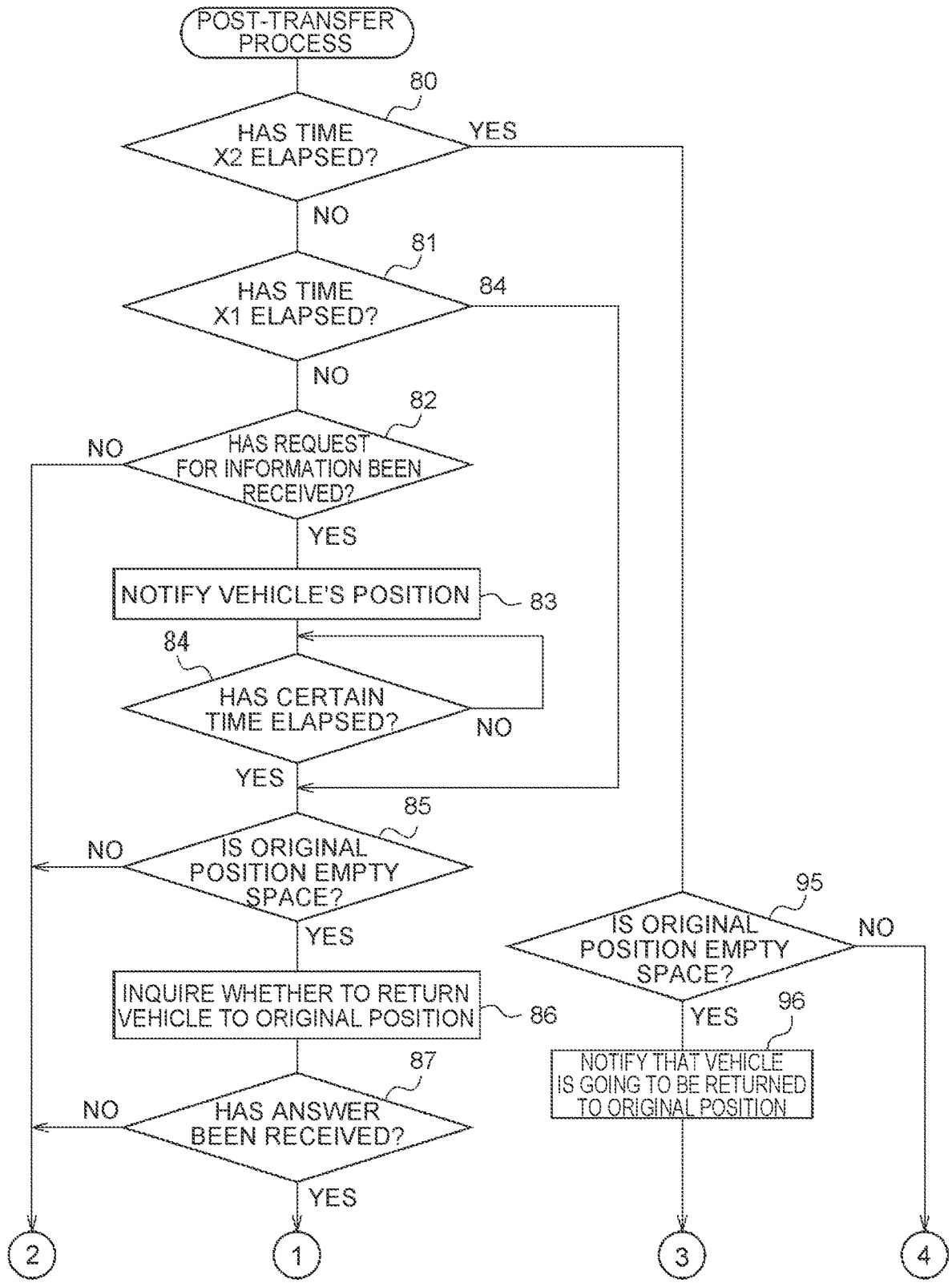
FIG. 9 is a flowchart for performing a post-transfer process executed after transfer to a parking place.

FIG. 9 and FIG. 10 show a post-transfer process routine that is performed after transfer to a parking place, and this routine is repeatedly executed in the CPU 26 of the electronic control unit 24 installed in the vehicle 20.

Referring to FIG. 9 and FIG. 10, first, in step 80, it is determined whether the second predetermined time X2 has elapsed since the transfer of the vehicle, i.e., whether the vehicle 20 has not been driven for the second predetermined time X2 or longer since the transfer of the vehicle. When it is determined that the second predetermined time X2 has not elapsed since the transfer of the vehicle, the process moves to step 81, in which it is determined whether the first predetermined time X1 (<the second predetermined time X2) has elapsed since the transfer of the vehicle. When it is determined that the first predetermined time X1 has not elapsed since the transfer of the vehicle, the process moves to step 82, in which it is determined whether a request for provision of information showing the position of the vehicle 20 has been received from the user of the vehicle 20. For example, this request for provision of information showing the position of the vehicle 20 is made by using the mobile terminal 40 of the user of the vehicle 20.

When it is determined that no request for provision of information showing the position of the vehicle 20 has been received from the user of the vehicle 20, the process cycle is ended. On the other hand, when it is determined that a request for provision of information showing the position of the vehicle 20 has been received from the user of the vehicle 20, the process moves to step 83, in which information showing the position of the vehicle 20 is notified to the user of the vehicle 20. In this case, various methods can be used as the method of notifying the information showing the position of the vehicle 20 to the user of the vehicle 20. A first method is a method of displaying the information on the position of the vehicle 20 on the mobile terminal 40 of the user of the vehicle 20. A second method is a method of configuring the vehicle body so as to emit light, for example, flash the headlights or the interior lights. A third method is a method of configuring the vehicle body so as to emit sound, for example, sound the horn.

Next, in step 84, the process waits for a certain time to pass after notifying the information showing the position of the vehicle 20 to the user of the vehicle 20, and when the vehicle 20 is not moved before the certain time elapses, the process moves to step 85. On the other hand, when it is determined in step 81 that the first predetermined time X1 has elapsed since the transfer of the vehicle, the process moves to step 85. In step 85, it is determined whether the original parking space, i.e., the first parking space 4 or 14, is empty. When it is determined that the original parking space is not empty, the process cycle is ended. On the other hand, when it is determined that the original parking space is empty, the process moves to step 86, in which an inquiry as to whether the vehicle 20 may be returned to the original parking space is sent to the mobile terminal 40 of the user of the vehicle 20. In this way, in the embodiment according to the present disclosure, when a request for provision of information showing the position of the vehicle 20 is received from the user of the vehicle 20, or when the first predetermined time X1 has elapsed since the transfer of the vehicle, an inquiry as to whether the vehicle 20 may be returned to the original parking space is made to the user of the vehicle 20.

Next, in step 87, it is determined whether an answer to the inquiry has been received from the user of the vehicle 20. When it is determined that no answer has been received from the user of the vehicle 20, the process cycle is ended. On the other hand, when it is determined that an answer has been received from the user of the vehicle 20, the process moves to step 88, in which it is determined whether the answer is an answer to the effect that the vehicle 20 may be returned to the original parking space. When the answer is not an answer to the effect that the vehicle 20 may be returned to the original parking space, i.e., the answer is not an answer permitting the transfer of the vehicle 20, the process cycle is ended. On the other hand, when the answer is an answer permitting the transfer of the vehicle 20, the process moves to step 89, in which the original parking space is determined as a transfer destination. Next, in step 90, based on the determined transfer destination and the current position of the vehicle 20 acquired by the GNSS reception device 31, a travel route of the vehicle 20 from the current position to the original parking space is determined by the navigation device 33.

Next, the process moves to step 91, in which the vehicle 20 is transferred from the second parking space 5 or 15 to the first parking space 4 or 14 by autonomous driving. Specifically, in step 91, based on detection results of sensors including the camera that images the front side etc. of the vehicle 20, the lidar, the radar, and the like, a travel path and a travel speed of the vehicle 20 in the travel route determined in step 90 such that the vehicle 20 does not hit other vehicles or pedestrians are determined. Next, in step 92, travel control of the vehicle 20 is performed in accordance with the determined travel path and travel speed. Then, in step 93, it is determined whether the vehicle 20 has reached the transfer destination, i.e., the first parking space 4 or 14. When it is determined that the vehicle 20 has not reached the transfer destination, the process returns to step 91 and autonomous driving of the vehicle 20 is continued. In this way, the vehicle 20 is autonomously driven to the transfer destination. When it is determined in step 93 that the vehicle 20 has reached the transfer destination, i.e., the first parking space 4 or 14, the process moves to step 94, in which autonomous parking control is performed.

In this autonomous parking control, as described above, the camera that images the front side, the lateral sides, and the rear side of the vehicle 20 generates a two-dimensional image of the vehicle 20 and the surroundings of the vehicle 20 as seen from above, and based on this two-dimensional image, a travel path required to transfer the vehicle 20 to a parking position inside the empty parking space without hitting other vehicles and structures in the surrounding area is generated, and the vehicle 20 is transferred to the parking position inside the empty parking space along this travel path by autonomous driving. When the vehicle 20 stops at the parking position inside the empty parking space and the autonomous parking process of the vehicle 20 ends, a notification saying that the vehicle 20 has been transferred from the second parking space 5 or 15 to the first parking space 4 or 14 is sent to the mobile terminal 40 of the user of the vehicle 20.

On the other hand, when it is determined in step 80 that the second predetermined time X2 has elapsed since the transfer of the vehicle, the process moves to step 95, in which it is determined whether the original parking space, i.e., the first parking space 4 or 14 is empty. When it is determined that the original parking space is not empty, the process cycle is ended. On the other hand, when it is determined that the original parking space is empty, the process moves to step 96, in which a notification saying that the vehicle 20 is going to be returned to the original parking space is sent to the mobile terminal 40 of the user of the vehicle 20. Next, the process moves to step 89, in which autonomous driving control of returning the vehicle 20 to the original parking space is performed.

Thus, in the embodiment according to the present disclosure, the position of the vehicle is displayed on the mobile terminal 40 of the user of the vehicle 20, or the vehicle body is configured to emit light or sound, when the vehicle 20 receives a request for provision of information about the parking place of the vehicle 20 from the user of the vehicle 20 after the vehicle 20 has been transferred from the first parking space 4 or 14 to the second parking space 5 or 15.

In the embodiment according to the present disclosure, when the first predetermined time X1 has elapsed, or a request for provision of information about the parking place of the vehicle 20 is received from the user of the vehicle 20, after the vehicle 20 has been transferred from the first parking space 4 or 14 to the second parking space 5 or 15, an inquiry is made to the user of the vehicle 20 as to whether to transfer the vehicle 20 from the second parking space 5 or 15 to the first parking space 4 or 14. When the user of the vehicle 20 permits the transfer of the vehicle, the vehicle 20 is controlled by the vehicle transfer control unit (FIG. 6) such that the vehicle 20 is transferred from the second parking space 5 or 15 to the first parking space 4 or 14 by autonomous driving. In this case, when the second predetermined time X2, longer than the first predetermined time X1, has elapsed since the vehicle 20 has been transferred from the first parking space 4 or 14 to the second parking space 5 or 15, the user of the vehicle 20 is notified that the vehicle 20 is going to be transferred from the second parking space 5 or 15 to the first parking space 4 or 14, and the vehicle 20 is controlled by the vehicle transfer control unit (FIG. 6) such that the vehicle 20 is transferred from the second parking space 5 or 15 to the first parking space 4 or 14 by autonomous driving.

What is claimed is:

1. A vehicle autonomous driving system that autonomously drives a vehicle in an environment where a first road for vehicles running in a first direction and a second road for vehicles running in a second direction, different from the first direction, are provided alongside each other, and where a first parking space that is entered from the first road and exited to the first road is set and a second parking space that is entered from the second road and exited to the second road is set, the vehicle autonomous driving system comprising:
   an acquisition unit that acquires information about a next destination of a vehicle parked in the first parking space;
   a recognition unit that recognizes, based on the acquired next destination, whether a running direction of the vehicle heading for the next destination is the second direction; and
   a vehicle transfer control unit that, when it is recognized that the running direction of the vehicle heading for the next destination is the second direction, transfers the vehicle from the first parking space to the second parking space by autonomous driving after a user of the vehicle gets out of the vehicle.

2. The vehicle autonomous driving system according to claim 1, wherein the first road and the second road are formed adjacent to each other, and the first parking space and the second parking space are set on opposite sides from each other across a border between the first road and the second road.

3. The vehicle autonomous driving system according to claim 2, wherein the first parking space is set along the first road and the second parking space is set along the second road.

4. The vehicle autonomous driving system according to claim 1, wherein, when the vehicle has been transferred from the first parking space to the second parking space by autonomous driving, a notification saying that the vehicle has been transferred is sent to a mobile terminal of the user of the vehicle.

5. The vehicle autonomous driving system according to claim 1, wherein the acquisition unit acquires information about a time taken for the user of the vehicle to return to the vehicle after the vehicle is parked in the first parking space, and the vehicle transfer control unit transfers the vehicle from the first parking space to the second parking space by autonomous driving when it is possible to transfer the vehicle from the first parking space to the second parking space before the user of the vehicle returns to the vehicle.

6. The vehicle autonomous driving system according to claim 1, wherein the vehicle transfer control unit transfers the vehicle from the first parking space to the second parking space by autonomous driving when a distance from the first parking space to the second parking space is equal to or shorter than a predetermined distance or when a time taken to walk from the first parking space to the second parking space is equal to or shorter than a predetermined time.

7. The vehicle autonomous driving system according to claim 1, wherein the acquisition unit acquires information about an external environment, and the vehicle transfer control unit does not transfer the vehicle from the first parking space to the second parking space by autonomous driving when the weather is bad or a road condition is bad.

8. The vehicle autonomous driving system according to claim 1, wherein a position of the vehicle is displayed on a mobile terminal of the user of the vehicle, or a vehicle body is configured to emit light or sound, when the vehicle receives a request for provision of information about a parking place of the vehicle from the user of the vehicle after the vehicle has been transferred from the first parking space to the second parking space.

9. The vehicle autonomous driving system according to claim 1, wherein, when a first predetermined time has elapsed since the vehicle has been transferred from the first parking space to the second parking space or when a request for provision of information about a parking place of the vehicle is received from the user of the vehicle, the vehicle autonomous driving system inquires of the user of the vehicle whether to transfer the vehicle from the second parking space to the first parking space, and when the user of the vehicle permits the transfer of the vehicle, the vehicle transfer control unit controls the vehicle such that the vehicle is transferred from the second parking space to the first parking space by autonomous driving.

10. The vehicle autonomous driving system according to claim 9, wherein, when a second predetermined time, longer than the first predetermined time, has elapsed since the vehicle has been transferred from the first parking space to the second parking space, the vehicle autonomous driving system notifies the user of the vehicle that the vehicle is going to be transferred from the second parking space to the first parking space, and the vehicle transfer control unit controls the vehicle such that the vehicle is transferred from the second parking space to the first parking space by autonomous driving.

11. A vehicle autonomous driving method that autonomously drives a vehicle in an environment where a first road for vehicles running in a first direction and a second road for vehicles running in a second direction, different from the first direction, are provided alongside each other, and where a first parking space that is entered from the first road and exited to the first road is set and a second parking space that is entered from the second road and exited to the second road is set, the vehicle autonomous driving method comprising:

acquiring information about a next destination of a vehicle parked in the first parking space;

based on the acquired next destination, recognizing whether a running direction of the vehicle heading for the next destination is the second direction; and when it is recognized that the running direction of the vehicle heading for the next destination is the second direction, transferring the vehicle from the first parking space to the second parking space by autonomous driving after a user of the vehicle gets out of the vehicle.

12. A non-transitory storage medium storing a program that autonomously drives a vehicle in an environment where a first road for vehicles running in a first direction and a second road for vehicles running in a second direction, different from the first direction, are provided alongside each other, and where a first parking space that is entered from the first road and exited to the first road is set and a second parking space that is entered from the second road and exited to the second road is set, the non-transitory storage medium storing the program causing a computer to function to:

acquire information about a next destination of a vehicle parked in the first parking space;

based on the acquired next destination, recognize whether a running direction of the vehicle heading for the next destination is the second direction; and when it is recognized that the running direction of the vehicle heading for the next destination is the second direction, transferring the vehicle from the first parking space to the second parking space by autonomous driving after a user of the vehicle gets out of the vehicle.

* * * * *